(12) United States Patent
Ohtsu et al.

(10) Patent No.: US 8,670,203 B2
(45) Date of Patent: Mar. 11, 2014

(54) METHOD FOR MANUFACTURING MAGNETIC TAPE WITH SERVO SIGNAL WRITTEN THEREIN, MAGNETIC TAPE WITH SERVO SIGNAL WRITTEN THEREIN, AND SERVO WRITER

(75) Inventors: Hiroki Ohtsu, Odawara (JP); Yuichi Kurihashi, Odawara (JP); Kazuyuki Shiino, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 229 days.

(21) Appl. No.: 13/220,793

(22) Filed: Aug. 30, 2011

(65) Prior Publication Data

US 2012/0050908 A1    Mar. 1, 2012

(30) Foreign Application Priority Data

Aug. 31, 2010   (JP) ................. 2010-194447

(51) Int. Cl.
*G11B 5/03*    (2006.01)
*G11B 5/78*    (2006.01)

(52) U.S. Cl.
USPC ............................................ 360/66; 360/134

(58) Field of Classification Search
None
See application file for complete search history.

(56) References Cited

U.S. PATENT DOCUMENTS

| | | | | |
|---|---|---|---|---|
| 4,149,204 A * | 4/1979 | Marino et al. | ............ | 360/123.17 |
| 4,701,815 A * | 10/1987 | Yada et al. | ................. | 360/77.06 |
| 4,841,383 A * | 6/1989 | Nishimoto et al. | ........... | 386/287 |
| 5,689,384 A * | 11/1997 | Albrecht et al. | ........... | 360/77.12 |
| 6,031,673 A * | 2/2000 | Fasen et al. | ...................... | 360/53 |
| 6,236,537 B1 * | 5/2001 | Poorman et al. | .............. | 360/122 |
| 6,278,571 B1 * | 8/2001 | Bui et al. | ..................... | 360/77.12 |
| 6,542,325 B1 * | 4/2003 | Molstad et al. | ............ | 360/77.12 |
| 6,791,774 B1 * | 9/2004 | Albrecht et al. | ................ | 360/17 |
| 7,551,380 B2 | 6/2009 | Watson et al. | | |
| 7,885,032 B1 * | 2/2011 | Rahman et al. | ................. | 360/66 |
| 2003/0016466 A1 * | 1/2003 | Bui et al. | ................... | 360/73.12 |
| 2003/0151844 A1 * | 8/2003 | Eaton et al. | ..................... | 360/75 |
| 2004/0051994 A1 * | 3/2004 | Akiyama et al. | ........... | 360/77.07 |
| 2004/0120061 A1 * | 6/2004 | Yip et al. | ........................ | 360/48 |
| 2004/0207943 A1 * | 10/2004 | Nakao et al. | ..................... | 360/48 |
| 2004/0265635 A1 | 12/2004 | Ishiguro | | |
| 2005/0041324 A1 * | 2/2005 | Tateishi et al. | ............. | 360/77.12 |
| 2005/0052780 A1 * | 3/2005 | Kira | ........................... | 360/77.12 |
| 2005/0052783 A1 * | 3/2005 | Suda | ............................. | 360/121 |
| 2005/0152065 A1 * | 7/2005 | Hashimoto et al. | ...... | 360/130.31 |
| 2005/0168869 A1 * | 8/2005 | Dugas et al. | .................. | 360/118 |

(Continued)

FOREIGN PATENT DOCUMENTS

JP    2005-025820    1/2005
JP    2007220179 A    8/2007

OTHER PUBLICATIONS

Notification of Reason(s) for Refusal, dispatched Oct. 15 2013, issued in corresponding JP Application No. 2010-194447, 9 pages in English and Japanese.

*Primary Examiner* — Peter Vincent Agustin
(74) *Attorney, Agent, or Firm* — Sughrue Mion, PLLC

(57) ABSTRACT

To manufacture a perpendicular magnetic recording-type magnetic tape having a servo signal written therein by a write head having a magnetic gap, a perpendicular direct-current erasing step in which a magnetic tape is magnetized in one direction that is one of two opposite thickness directions of the magnetic tape is performed before a signal writing step in which a servo signal is written in the magnetic tape by outputting a pulsed signal to the write head.

12 Claims, 8 Drawing Sheets

(56) References Cited

U.S. PATENT DOCUMENTS

| | | | |
|---|---|---|---|
| 2005/0219734 A1* | 10/2005 | Rothermel et al. | 360/75 |
| 2008/0285171 A1* | 11/2008 | Tanaka et al. | 360/77.12 |
| 2010/0020433 A1* | 1/2010 | Moribe et al. | 360/75 |
| 2010/0246062 A1* | 9/2010 | Albrecht et al. | 360/131 |
| 2012/0050908 A1* | 3/2012 | Ohtsu et al. | 360/66 |
| 2012/0050910 A1* | 3/2012 | Ohtsu et al. | 360/77.12 |

* cited by examiner

FIG. 6A EXAMPLE 1
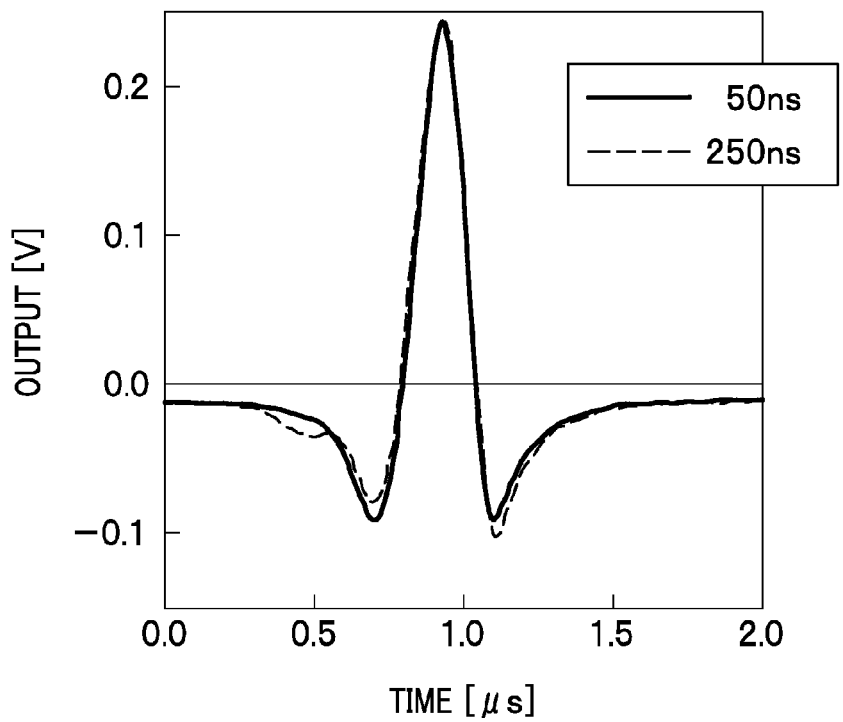
FIG. 6B EXAMPLE 2
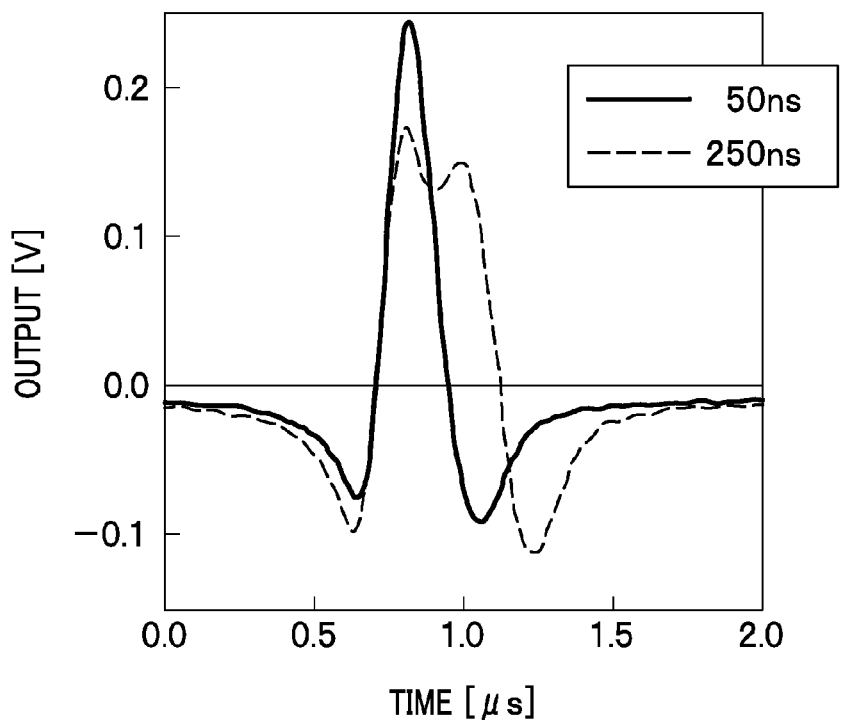

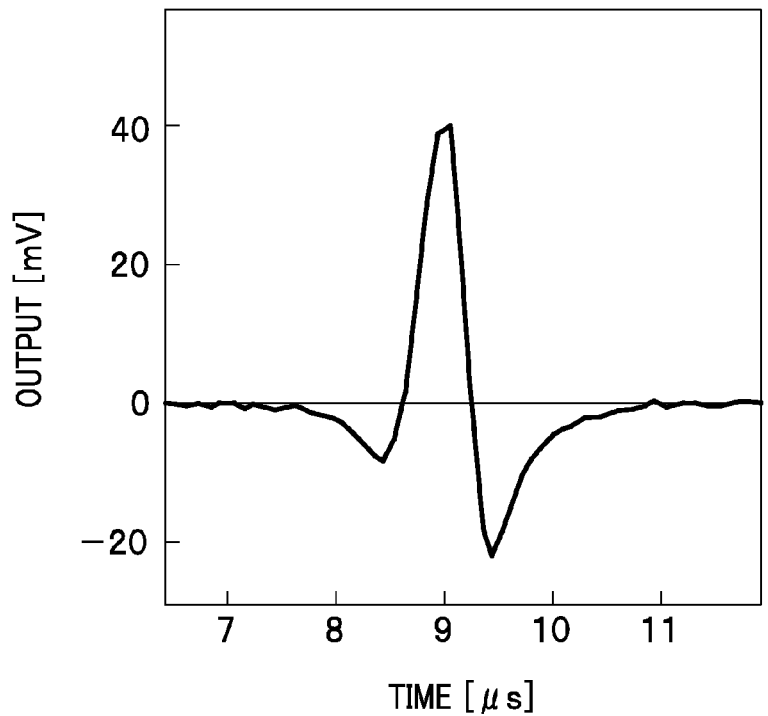
FIG. 7A  EXAMPLE 3
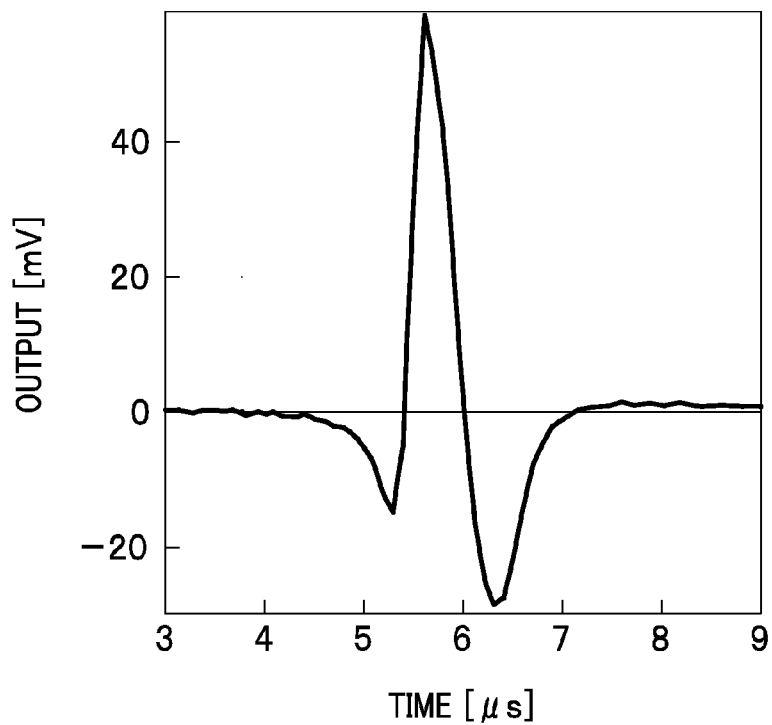
FIG. 7B  EXAMPLE 4

METHOD FOR MANUFACTURING MAGNETIC TAPE WITH SERVO SIGNAL WRITTEN THEREIN, MAGNETIC TAPE WITH SERVO SIGNAL WRITTEN THEREIN, AND SERVO WRITER

CROSS-REFERENCE TO RELATED APPLICATION(S)

This application claims priority from Japanese Patent Application No. 2010-194447, filed on Aug. 31, 2010 in the Japan Patent Office, the disclosure of which is herein incorporated by reference in its entirety.

BACKGROUND

1. Field

One or more aspects of the present invention relate to a method for manufacturing a magnetic tape with a servo signal written therein, a magnetic tape with a servo signal written therein, and a servo writer.

2. Description of Related Art

In accordance with the trend toward higher recording density in the realm of information storage technologies, the data tracks of a magnetic tape designed in recent years should have extremely narrow widths. To enable the magnetic head to precisely follow such a narrow data track, a servo signal indicating a reference position of the data track is written beforehand in the magnetic tape. In a magnetic tape drive which records or retrieves data in the magnetic tape, a track-following servo control is exercised in which the servo signal recorded in advance is read out to work out an amount of deviation in position between the data track in which data is just to be recorded or retrieved and the magnetic head so that the magnetic head is regulated based on the amount of shift in position to follow the data track.

The servo signal may be written in the magnetic tape by supplying a write head of the servo writer with a recording current (pulsed signal) which causes the write head to produce a magnetic field magnetizing a portion of the magnetic tape in a predetermined direction. To be more specific, in a magnetic tape for use in longitudinal magnetic recording, as shown in FIG. 8A, a servo signal may be written by a write head WH magnetizing an unmagnetized portion of a magnetic tape MT in one direction (rightward direction in FIG. 8A) that is one of two opposite longitudinal directions of the magnetic tape MT. Alternatively, as shown in FIG. 8B, a servo signal may be written by a write head WH magnetizing a one-directionally pre-magnetized portion of a magnetic tape MT (i.e., magnetized in one of two opposite longitudinal directions of the magnetic tape MT; leftward direction in FIG. 8B), in one direction (rightward direction in FIG. 8B) opposite to the direction in which the portion is pre-magnetized. See Patent Document 1 (listed below). On the other hand, in a magnetic tape for use in perpendicular magnetic recording, as shown in FIG. 8C, a servo signal may be written by a write head WH magnetizing an unmagnetized portion of a magnetic tape MT in a direction of thickness (upward/downward direction in FIG. 8C). When the servo signal written in either way is read out, a readback signal having a waveform with a pair of peaks of opposite polarities is obtained.

Patent Document 2 (listed below) discloses that a signal having a waveform with a peak of a single polarity (this signal will hereinafter be referred to as "unipolar-pulse signal") is used for track-following servo control exercised over the magnetic head. The use of such a unipolar-pulse signal enables increased writing density of a servo signal in the longitudinal direction of the magnetic tape, and thus results in increased speed of the track-following servo control exercised over the magnetic head.

[Patent Documents]
1. JP 2005-25820 A
2. U.S. Pat. No. 7,551,380 B2

Document 2 above, however, fails to disclose a specific method for obtaining a unipolar-pulse signal.

SUMMARY

It is one aspect of the present invention to provide a method and an apparatus by which a unipolar-pulse servo signal is made available, and a magnetic tape with a unipolar-pulse servo signal written therein.

More specifically, in one aspect of the present invention, a method for manufacturing a perpendicular magnetic recording-type magnetic tape with a servo signal written therein by a write head having a magnetic gap is disclosed. The method comprises a perpendicular direct-current erasing step and a signal writing step. In the perpendicular direct-current erasing step, a magnetic tape is magnetized in one direction that is one of two opposite thickness directions of the magnetic tape. In the signal writing step, a servo signal is written in the magnetic tape by outputting a pulsed signal to the write head after the perpendicular direct-current erasing step.

With this method, the perpendicular magnetic recording-type magnetic tape can be provided with a first portion magnetized with a perpendicular component of magnetization orienting in one direction that is one of two opposite thickness directions of the magnetic tape, and a second portion (i.e., portion constituting the servo signal) magnetized with a perpendicular component of magnetization orienting in a direction opposite to the one direction. Accordingly, when the servo signal is read out, the obtained servo signal can be a unipolar-pulse signal having a waveform such that peaks corresponding to the second portions appear in the background corresponding to the first portions.

The perpendicular magnetic recording-type magnetic tape (i.e., a magnetic tape for use in perpendicular magnetic recording) in this configuration may preferably but not necessarily have a high squareness (hereinafter referred to as "perpendicular SQ"), that is the ratio of a perpendicular component of magnetization (i.e., the component whose magnetic pole orients in a thickness direction of the magnetic tape); for example, the perpendicular SQ not less than 0.5 may be preferable. The SQ value mentioned herein is a value after demagnetizing field correction.

The write head used in the method described above may be configured to include a magnetic element having a leading edge and a trailing edge between which the magnetic gap is formed, the leading edge defining at an upstream end of the magnetic gap in a direction of transport of the magnetic tape and the trailing edge defining a downstream end of the magnetic gap in the direction of transport of the magnetic tape.

The aforementioned signal writing step may comprise using a pulsed signal such that a perpendicular component of magnetic field produced thereby at the leading edge orients in a direction opposite to the one direction, to write the servo signal in the magnetic tape. Alternatively, the aforementioned signal writing step may comprise using a pulsed signal such that a perpendicular component of magnetic field produced thereby at the trailing edge orients in a direction opposite to the one direction, to write the servo signal in the magnetic tape.

Herein, the perpendicular component of magnetic field refers to a component of magnetic field produced at the leading or trailing edge which component causes magnetic layer of the magnetic tape to orient in the thickness direction of the magnetic tape.

The methods described above, with or without any optional features, may further comprise a longitudinal direct-current erasing step performed prior to the signal writing step. In the longitudinal direct-current erasing step, the magnetic tape is magnetized in one of two opposite longitudinal directions of the magnetic tape that is a direction in which a longitudinal component of magnetic field leaked at the magnetic gap orients.

With this additional feature, the longitudinally oriented component of magnetization in the magnetic layer of the magnetic tape can be consistently oriented in one direction (the one of the opposite longitudinal directions of the magnetic tape; i.e., the direction of magnetization in the portion constituting the servo signal). In other words, the direction of longitudinally oriented component of magnetization in the portion constituting the servo signal can be rendered in conformity with the direction of longitudinally oriented component of magnetization in the remaining portion (background). Accordingly, the intensity of a signal (i.e., noise) derived from the longitudinally oriented component in the readback servo signal can be made smaller.

Herein, the longitudinal component of magnetic field refers to a component of the magnetic field leaked at the leading and trailing edges which component causes magnetic layer of the magnetic tape to orient in the longitudinal direction of the magnetic tape.

In the methods described above, the perpendicular direct-current erasing step may be performed after the longitudinal direct-current erasing step.

In alternative embodiments where the perpendicular direct-current erasing step is performed prior to the longitudinal direct-current erasing step, the once-consistently oriented perpendicular component of magnetization would possibly be disturbed through the subsequent longitudinal direct-current erasing step, thereby producing an undesired noise in the readback servo signal. In contrast, the longitudinal direct-current erasing step performed prior to the perpendicular direct-current erasing step cannot disturb the perpendicular component of magnetization in the magnetic tape, and thus may serve to reduce the noise in the readback servo signal.

In another aspect, a perpendicular magnetic recording-type magnetic tape comprising a servo band with a servo signal written therein is disclosed. The servo band includes a first portion constituting a background for the servo signal, and a second portion constituting the servo signal. The first portion is magnetized with a perpendicular component of magnetization orienting in one direction that is one of two opposite thickness directions of the magnetic tape. The second portion is magnetized with a perpendicular component of magnetization orienting in a direction opposite to the one direction.

With this configuration, when the servo signal is read out, the obtained servo signal can be a unipolar-pulse signal having a waveform such that peaks corresponding to the second portions appear in the background corresponding to the first portions.

In the perpendicular magnetic recording-type magnetic tape configured as described above, the first and second portions of the servo band may be configured to have magnetism of which longitudinal components of magnetization orients in one direction that is one of two opposite longitudinal directions of the magnetic tape.

Since the tape with this additional feature is configured such that longitudinal components of magnetization (i.e., the component whose magnetic pole orients in the longitudinal direction of the magnetic tape) orient in the same direction that is one of two opposite longitudinal directions of the magnetic tape, the intensity of a signal derived from the longitudinally oriented component in the readback servo signal (i.e., noise) can be made smaller.

In yet another aspect, a servo writer for writing a servo signal in a magnetic tape for use in perpendicular magnetic recording is disclosed. The servo writer comprises a write head, a signal output unit and a perpendicular direct-current erasing head. The write head has a magnetic gap, and is configured to write the servo signal in the magnetic tape. The signal output unit is configured to output a pulsed signal to the write head. The perpendicular direct-current erasing head is provided in a position upstream relative to the write head along a path traveled by the magnetic tape. The perpendicular direct-current erasing head is configured to magnetize the magnetic tape in one direction that is one of two opposite thickness directions of the magnetic tape.

With the servo writer configured as described above, the magnetic tape can be provided with a first portion magnetized with a perpendicular component of magnetization orienting in one direction that is one of two opposite thickness directions of the magnetic tape, and a second portion (i.e., portion constituting the servo signal) magnetized with a perpendicular component of magnetization orienting in a direction opposite to the one direction. Accordingly, when the servo signal is read out, the obtained servo signal can be a unipolar-pulse signal having a waveform such that peaks corresponding to the second portions appear in the background corresponding to the first portions.

In the servo writer described above, the write head may be configured to include a magnetic element having a leading edge and a trailing edge between which the magnetic gap is formed, the leading edge defining an upstream end of the magnetic gap in a direction of transport of the magnetic tape and the trailing edge defining a downstream end of the magnetic gap in the direction of transport of the magnetic tape. The pulsed signal outputted by the signal output unit may, in one embodiment, be configured such that a perpendicular component of magnetic field produced by the pulsed signal at the leading edge orients in a direction opposite to the one direction.

In the servo writer with the write head configured as described above, the pulsed signal outputted by the signal output unit may, in an alternative embodiment, be configured such that a perpendicular component of magnetic field produced by the pulsed signal at the trailing edge orients in a direction opposite to the one direction.

Each of the above-described embodiments of the servo writer, with or without alternative features, may further comprise a longitudinal direct-current erasing head provided in a position upstream relative to the write head along the path traveled by the magnetic tape. The longitudinal direct-current erasing head is configured to magnetize the magnetic tape in one of two opposite longitudinal directions of the magnetic tape that is a direction in which a longitudinal component of magnetic field leaked at the magnetic gap orients.

With this additional feature, i.e., the longitudinal direct-current erasing head, the longitudinally oriented component of magnetization in the magnetic layer of the magnetic tape can be consistently oriented in one direction (the one of the opposite longitudinal directions of the magnetic tape; i.e., the direction of magnetization in the portion constituting the servo signal). As a result, the direction of longitudinally oriented component of magnetization in the portion constituting the servo signal can be rendered in conformity with the direction of longitudinally oriented component of magnetization in the background portion, and thus the intensity of a signal derived from the longitudinally oriented component in the readback servo signal (i.e., noise) can be made smaller.

In the servo writers described above, the perpendicular direct-current erasing head may be disposed in a position downstream relative to the longitudinal direct-current erasing head along the path traveled by the magnetic tape.

With this feature, the magnetic tape can be first magnetized in one of two opposite longitudinal directions of the magnetic tape, and thereafter magnetized in one of two opposite thickness directions of the magnetic tape. As a result, disturbance in the perpendicular component of magnetization oriented in the one of two opposite thickness directions of the magnetic tape can be suppressed, so that the noise in the readback servo signal can be reduced.

According to one or more embodiments, a unipolar-pulse signal can be obtained as a servo signal from the magnetic tape, and therefore a track-following servo control over the magnetic head can be performed with increased speed.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIG. 6A shows a readback signal obtained from a magnetic tape in which a servo signal is written at a leading edge of a write head;

FIG. 6B shows a readback signal obtained from a magnetic tape in which a servo signal is written at a trailing edge of the write head;

FIG. 7A shows a readback signal obtained from a magnetic tape made by a method including a longitudinal direct-current erasing step in which the magnetic tape is magnetized in the same longitudinal direction as that in which a longitudinal component of magnetic field leaked at the magnetic gap of a write head orients;

FIG. 7B shows a readback signal obtained from a magnetic tape made by a method including a longitudinal direct-current erasing step in which the magnetic tape is magnetized in one of the longitudinal directions opposite to that in which a longitudinal component of magnetic field leaked at the magnetic gap of the write head orients;

DETAILED DESCRIPTION OF THE EMBODIMENTS

Illustrative embodiments of the present invention will be described in detail with reference to the accompanying drawings.

First Embodiment

1. Magnetic Tape

At the outset, a magnetic tape with a servo signal written therein will be described.

Figure 1:
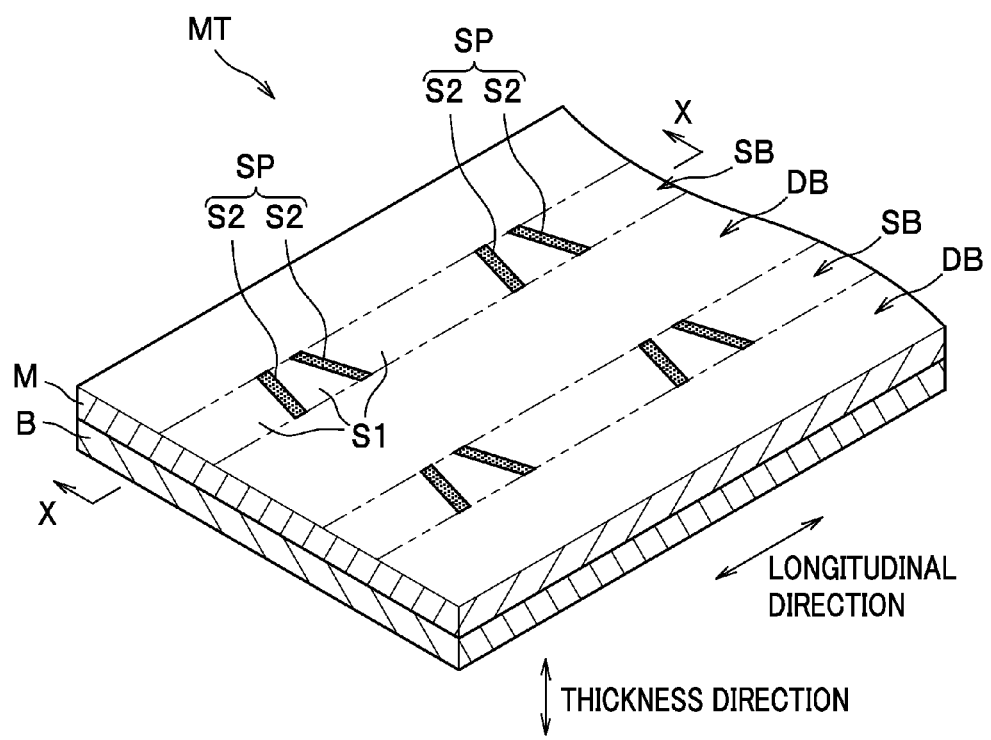
FIG. 1 is a schematic diagram showing a structure of a magnetic tape.

As shown in FIG. 1, a magnetic tape MT is a perpendicular magnetic recording-type magnetic tape (i.e., magnetic tape for use in perpendicular magnetic recording), which principally includes a base film B, and a magnetic layer M formed on the base film B.

The base film B is a supporting member for supporting the magnetic layer M. Examples of the base film B include a film made of polyethylene terephthalate (PET), etc.

The magnetic layer M is a layer in which data or servo signals are written in the form of magnetic patterns. The magnetic layer M is formed by applying magnetic coating composed of a mixture of magnetic material powder, a binder, etc. onto the base film B, and drying the magnetic coating. The magnetic material used in the magnetic layer M may be any material which can remain magnetized in the direction of thickness of the magnetic tape T (hereinafter referred to simply as "thickness direction") after data or servo signals are written therein. For example, a hexagonal crystal ferrite magnetic material, such as barium ferrite, strontium ferrite, etc., may be used. The binder for use in the magnetic layer M is not limited to any specific type. The magnetic layer M may further contain a carbon black, an abrasive and/or a lubricant known in the art. Moreover, the magnetic tape MT consistent with the present embodiment may include a non-magnetic layer and/or a back coat layer known in the art.

The magnetic tape MT is, as described above, a perpendicular magnetic recording-type magnetic tape, that is, a magnetic tape for use in perpendicular magnetic recording. In this type of magnetic tape MT, the magnetic material (magnetic dipole) contained in the magnetic layer M is magnetized in the thickness direction whereby data or servo signals are written therein. Thus, the magnetic layer M of the magnetic tape MT used in the present embodiment may preferably have a component to be dominantly oriented (i.e., more easily magnetized) in the thickness direction (i.e., perpendicular SQ is 0.5 or greater).

The perpendicular SQ exhibited when an alternating-current magnetic field (which renders a magnetic layer magnetically unoriented as a whole) is applied to a conventional longitudinal magnetic recording tape is about 0.2-0.3 at the highest. On the other hand, it has been shown that the perpendicular SQ exhibited when an alternating-current magnetic field is applied to a recently intensively studied longitudinal magnetic recording tape in which a barium ferrite magnetic material is used is 0.54-0.57.

In one or more embodiments of the present invention, it is particularly important that the intensity of the unipolar pulse outputted in one polarity (e.g., the positive polarity) is greater than the intensity of noises or other components outputted in the other polarity (i.e., the negative polarity). The value of the perpendicular SQ with which this can be achieved may vary to some extent depending on the magnetic material used.

Figure 2:
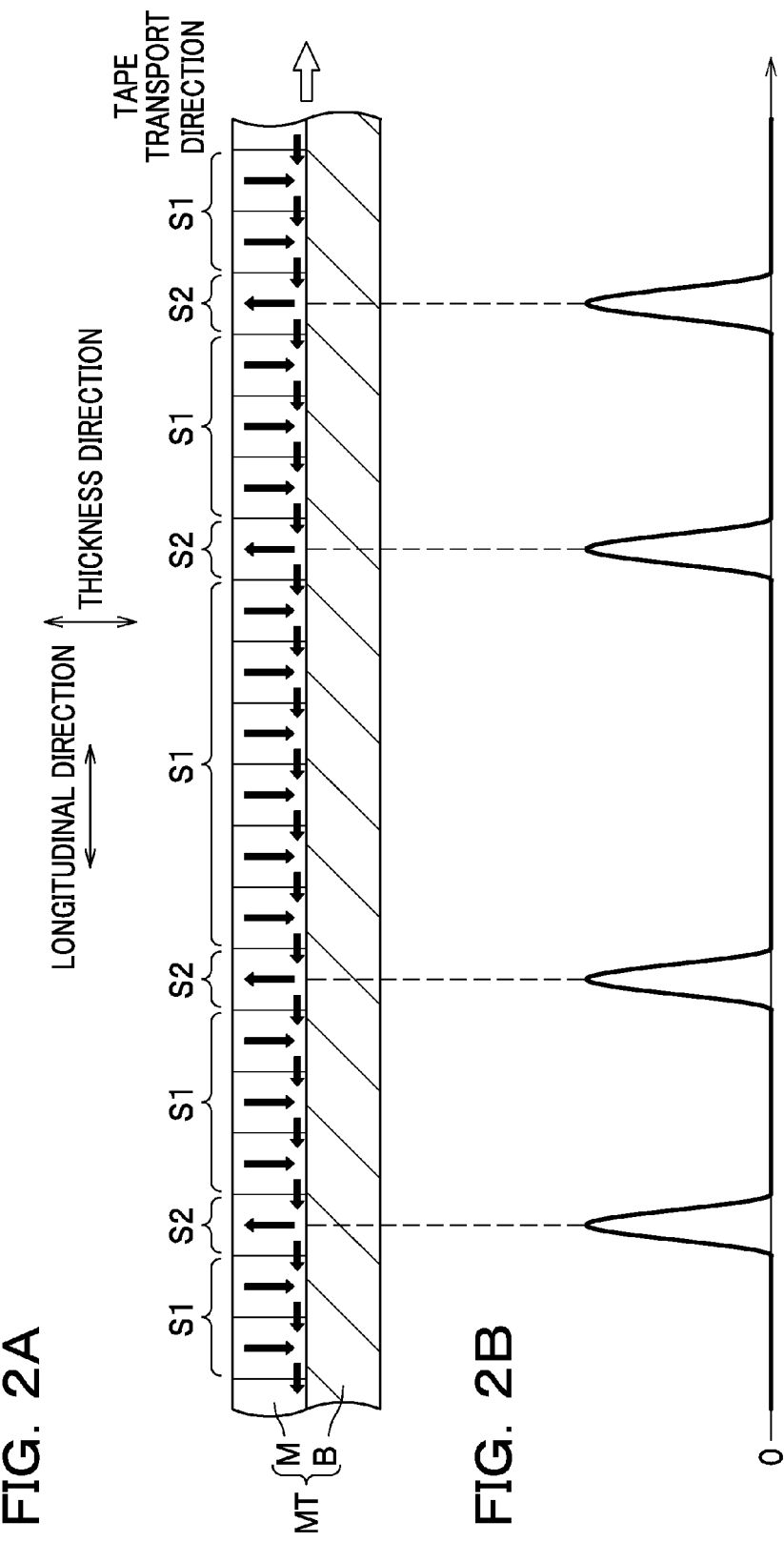
FIG. 2A is a sectional view of the magnetic tape taken along line X-X of FIG. 1.
FIG. 2B shows a readback signal obtained by reading out a servo signal written in the magnetic tape of FIG. 2A.

The magnetic tape MT (the magnetic layer M thereof) includes a data band DB and a servo band SB. Data is recorded in the data band DB by a known magnetic tape drive. A servo signal (servo pattern SP) is written in the servo band SB. As shown in FIGS. 1 and 2A, the servo band SB includes a first portion S1 magnetized in one direction that is one of two opposite thickness directions of the magnetic tape MT, and a second portion S2 magnetized in a direction opposite to the one direction. In the following description, for the purpose of clear and easy understanding, "one direction that is one of the two opposite thickness directions" will be referred to as "downward" direction and "a direction opposite to the one direction" will be referred to as "upward" direction, where appropriate, based upon the illustration in FIG. 2A and other drawing figures.

The first portion S1 of the servo band SB is a portion of the servo band SB which does not constitute a servo signal, and is formed by executing a perpendicular direct-current erasing step of magnetizing the magnetic layer M of the magnetic tape MT in the downward direction in the process of manufacturing the magnetic tape MT, as will be described later.

The second portion S2 is a portion of the servo band SB which constitutes a servo signal. To be more specific, a servo signal as a magnetic pattern is, as shown in FIG. 1, formed with servo patterns SP written at predetermined intervals in the longitudinal direction of the servo band SB. The shape of each servo pattern SP consistent with the present invention is not limited to any specific shape; in one or more embodiments, for example, at least one non-parallel set of stripes as shown in FIG. 1 may be adopted as the servo pattern SP.

When the servo band SB having a downwardly magnetized first portion S1 and an upwardly magnetized second portion S2 (constituting a servo signal) as described above is read out by a known magnetic head (read element), a readback signal having a waveform such that, as shown in FIG. 2B, single-polarity peaks corresponding to the second portions S2 appear in the background (as indicated by a line at the level 0) corresponding to the first portions S1 can be obtained. In other words, it is understood that the readback signal obtained in this embodiment is a unipolar-pulse signal.

As shown in FIG. 2A, the servo band SB (magnetic layer M) includes a magnetic component magnetized in the thickness direction (the component of the magnetic material whose magnetic pole orients in the thickness direction), and further includes a magnetic component magnetized in the longitudinal direction (the component of the magnetic material whose magnetic pole orients in the longitudinal direction). This longitudinal component of magnetization has a magnetic moment deviated to one direction (leftward in FIG. 2A) of two longitudinal directions (i.e., the magnetic moment orients in one direction that is one of the two longitudinal directions). This configuration contributes to reduction in intensity of the signal derived from the longitudinal component of magnetization (i.e., intensity of noise).

The data band DB is a conceptual area which is not actually defined before data is recorded therein. The magnetic material in the data band DB may be magnetized in one of two thickness directions or in one of two longitudinal directions, or may not be magnetized (i.e., may be magnetically non-oriented in entirety).

2. Servo Writer

A detailed description of the configuration of the servo writer for manufacturing a magnetic tape MT will be given hereafter.

Figure 3:
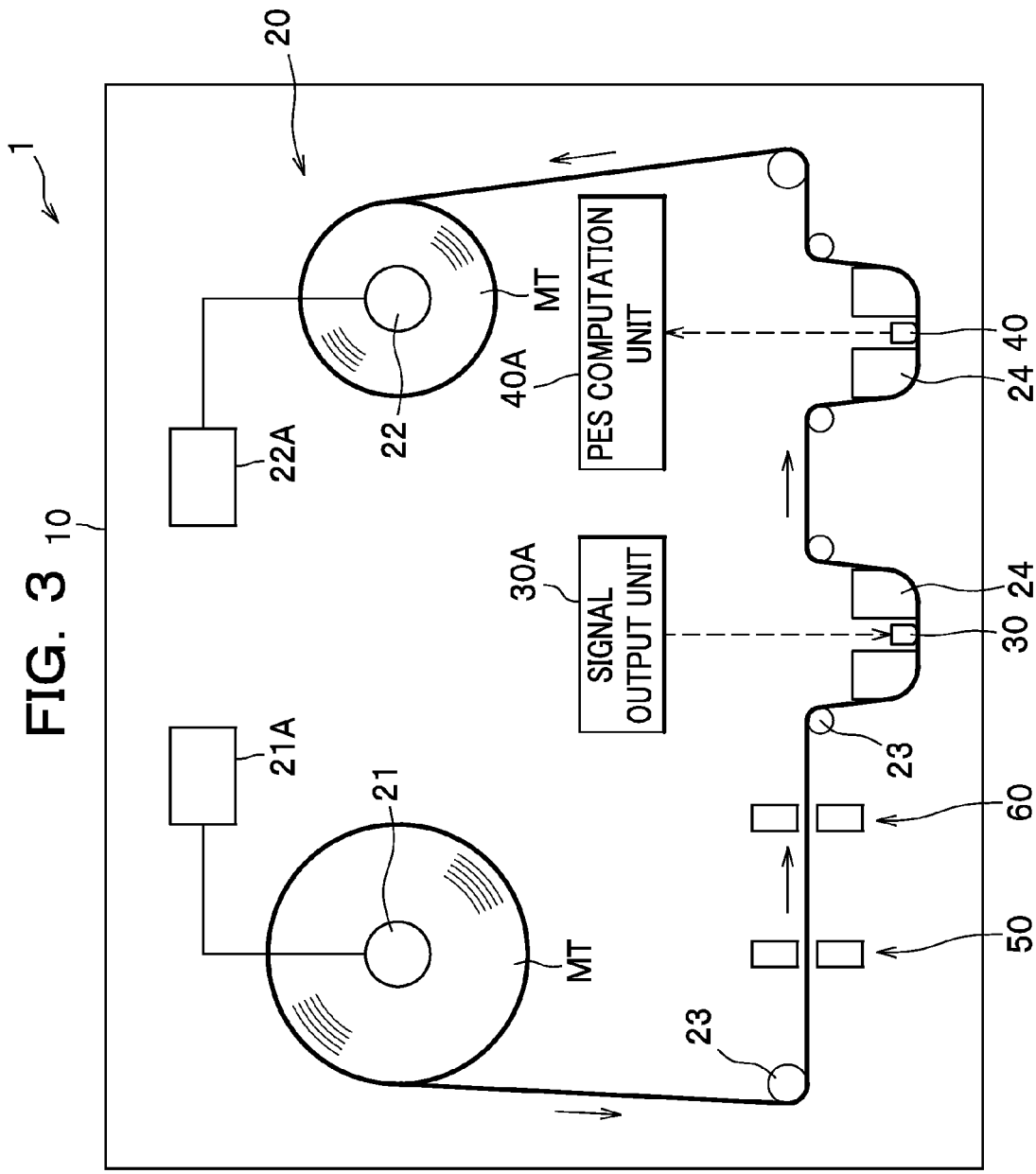
FIG. 3 is a schematic diagram showing a servo writer.

A servo writer 1 is a device mainly designed to write a servo signal in a magnetic tape MT. As shown in FIG. 3, the servo writer 1 mainly includes a base 10 and various components mounted on the base 10 which include a magnetic tape transport system 20, a write head 30, a verification head 40, a longitudinal direct-current erase head 50, and a perpendicular direct-current erase head 60.

The magnetic tape transport system 20 mainly includes a supply reel 21, a take-up reel 22, a plurality of guide rollers 23 and a plurality of tape guides 24. On the supply reel 21, a magnetic tape MT in which no servo signal has been written therein is wound up. The magnetic tape MT with a servo signal written therein is to be wound up on the take-up reel 22. The guide rollers 23 and the tape guides 24 are configured to guide the magnetic tape MT from the supply reel 21 to the take-up reel 22. The supply reel 21 is driven to rotate by a supply motor 21A. The take-up reel 22 is driven to rotate by a take-up motor 22A. In operation, a magnetic tape MT having no servo signal written therein is wound off the supply reel 21, guided by the guide rollers 23 and the tape guides 24 to run across the write head 30 that writes a servo signal therein, and wound up on the take-up reel 22.

The write head 30 is a magnetic head configured to write a servo signal (servo pattern SP) in a magnetic tape MT. The write head 30 is shaped generally like a plate. A surface of the write head 30 which is disposed opposite to the magnetic tape MT and across which the magnetic tape MT runs (slides along) has a magnetic gap G contoured to form a servo pattern SP (see FIG. 4C).

Figure 4A:
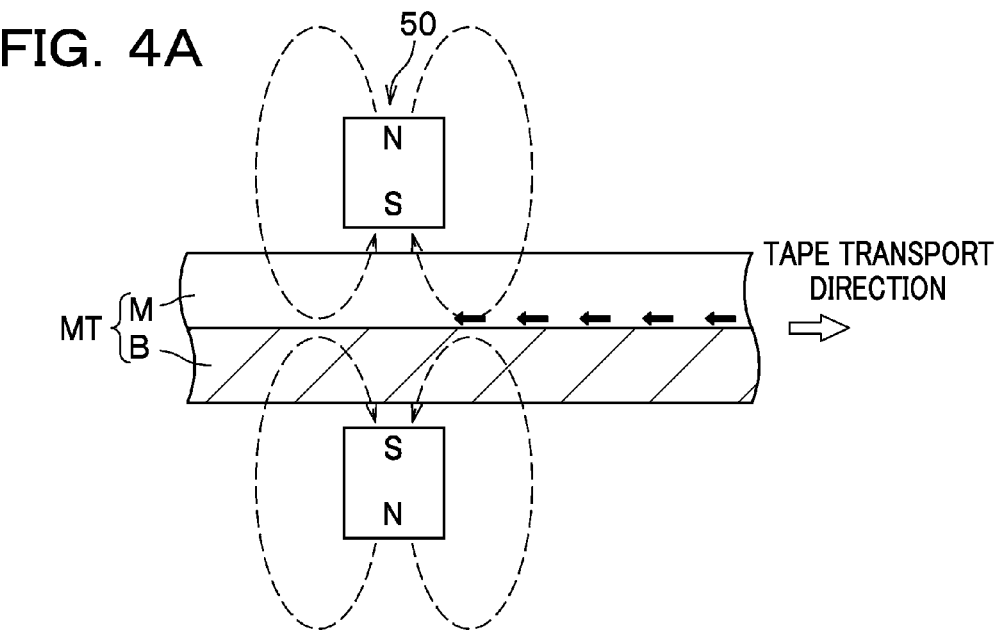
FIGS. 4A-4C show a method for manufacturing a magnetic tape according to a first embodiment.
Figure 4B:
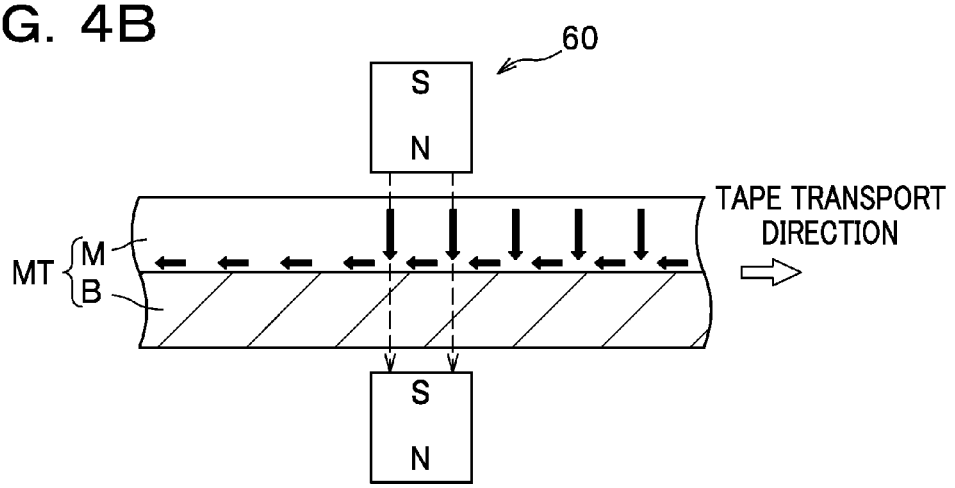
Figure 4C:
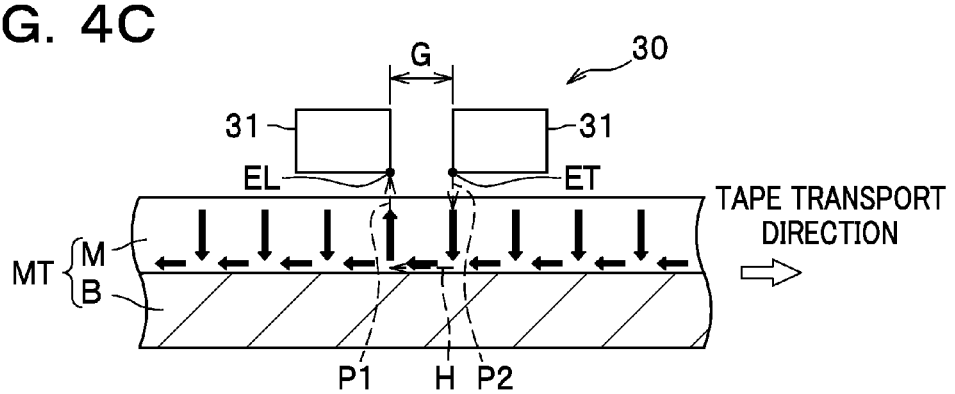

As shown in FIG. 4C, the magnetic gap G of the write head 30 is formed as an opening in a film-like magnetic element 31 (magnetic thin-film), which opening extends in a direction of transport (longitudinal direction) of the magnetic tape MT as viewed from the direction shown in FIG. 4C. In the following description, two edges (EL, ET) of the magnetic element 31 which form the magnetic gap G will be referred to as a leading edge EL and a trailing edge ET which are disposed at an upstream (left) end and at an downstream (right) end, respectively, in the direction of transport of the magnetic tape MT.

A signal output unit 30A (see FIG. 3) configured to output a pulsed signal to the write head 30 for writing a servo pattern is connected to the write head 30. In this embodiment, the pulsed signal outputted by the signal output unit 30A during the servo signal writing operation has a polarity such that a magnetic flux directed from the trailing edge ET through the inside of the magnetic layer M to the leading edge EL (see broken lines indicated in FIG. 4C) is formed near the magnetic gap G of the write head 30.

In this servo writer 1, the magnetic tape transport system 20 causes a magnetic tape MT to run across the write head 30, while the signal output unit 30A outputs a pulsed signal to the write head 30 repeatedly with an appropriate timing, so that a servo signal with servo patterns SP repeatedly formed at predetermined intervals in the longitudinal direction is written in the magnetic tape MT (the servo band SB thereof).

As shown in FIG. 3, the verification head 40 is a magnetic head for verifying the quality of a servo signal written in the magnetic tape MT. The verification head 40 is disposed downstream relative to the write head 30 in the direction of transport of the magnetic tape MT (hereinafter referred to as "tape transport direction"). Although not illustrated in the drawings, a known read element is disposed at a position in the verification head 40 corresponding to the servo band SB in the lateral direction of the magnetic tape MT.

A PES computation unit 40A is connected to the verification head 40. The PES computation unit 40A is a device configured to determine the quality of a servo signal (servo patterns SP) as a position error signal or PES (i.e., shift in the lateral direction of the magnetic tape MT) from an electric signal obtained from readings of the servo signal by the read element. In this servo writer 1, the quality of the servo signal written in the magnetic tape MT is verified based on PES values determined by the PES computation unit 40A.

The longitudinal direct-current erase head 50 is a magnetic head configured to magnetize a magnetic tape MT (longitudinal component of magnetization in magnetic material) in one of two longitudinal directions. The longitudinal direct-current erase head 50 is disposed upstream relative to the write head 30 and the perpendicular direct-current erase head 60 in the tape transport direction. As shown in FIG. 4A, the longitudinal direct-current erase head 50 is configured to form a magnetic flux (see broken lines in FIG. 4A) oriented in the longitudinal direction in the inside of the magnetic layer M, so that a portion of the running magnetic tape MT downstream relative to the longitudinal direct-current erase head 50 is magnetized in one direction (leftward in FIG. 4A) of the two longitudinal directions. In the present embodiment, the longitudinal direct-current erase head 50 is configured to magnetize the magnetic tape MT in one of two opposite longitudinal directions of the magnetic tape MT that is a direction in which a longitudinal component H of magnetic field leaked at the magnetic gap G (see FIG. 4C). In other words, the direction of magnetization effected by the longitudinal direct-current erase head 50 is the same as that of the longitudinal component H.

The structure of the longitudinal direct-current erase head 50 may be designed without limitation; i.e., the longitudinal direct-current erase head 50 may be composed of a permanent magnet or an electromagnet, for example. The magnetic flux density of the magnetic field induced by the longitudinal direct-current erase head 50 magnetizing the magnetic tape MT may be preferably 0.3 T or greater, and more preferably 0.5 T or greater, provided that the coercive force of the magnetic layer M (magnetic material) is 238.7 kA/m (3000 Oe), for example.

The perpendicular direct-current erase head 60 is a magnetic head configured to magnetize a magnetic tape MT (perpendicular component of magnetization in magnetic material) in one of two thickness directions. The perpendicular direct-current erase head 60 is disposed downstream relative to longitudinal direct-current erase head 50 and upstream relative to the write head 30 (i.e., between the longitudinal direct-current erase head 50 and the write head 30) in the tape transport direction. As shown in FIG. 4B, the perpendicular direct-current erase head 60 is configured to form a magnetic flux (see broken lines in FIG. 4B) oriented in the thickness direction as if it penetrates the magnetic layer M from the magnetic layer M side toward the base film B side, so that the magnetic tape MT is magnetized in the downward direction (one direction that is one of the two opposite thickness directions).

The structure of the perpendicular direct-current erase head 60 may be designed without limitation; i.e., the perpendicular direct-current erase head 60 may be composed of a permanent magnet or an electromagnet, for example. The magnetic flux density of the magnetic field induced by the perpendicular direct-current erase head 60 magnetizing the magnetic tape MT may be preferably 0.3 T or greater, and more preferably 0.5 T or greater, provided that the coercive force of the magnetic layer M (magnetic material) is 238.7 kA/m (3000 Oe), for example.

3. Method for Manufacturing a Magnetic Tape

A method for manufacturing a magnetic tape MT using a servo writer 1 will now be described in detail.

First, a magnetic tape MT in which no servo signal is written is set in the servo writer 1, and thereafter the supply motor 21A and the take-up motor 22A are activated to cause the magnetic tape MT to run from the supply reel 21 to the take-up reel 22.

At some midpoint of travel of the magnetic tape MT, as shown in FIG. 4A, the magnetic layer M of the magnetic tape MT is magnetized by the longitudinal direct-current erase head 50 in the leftward direction (one of the two opposite longitudinal directions), so that the longitudinal component of magnetization orients in the same direction in the magnetic material (Longitudinal direct-current erasing step).

Next, as shown in FIG. 4B, the magnetic layer M of the magnetic tape MT is magnetized by the perpendicular direct-current erase head 60 disposed in a position downstream relative to the longitudinal direct-current erase head 50 in the downward direction (one of the two opposite thickness directions), so that the perpendicular component of magnetization orients in the same direction in the magnetic material (Perpendicular direct-current erasing step).

After the perpendicular direct-current erasing step, a pulsed signal is outputted from the signal output unit 30A to the write head 30 to thereby write a servo signal (servo pattern SP) in the magnetic tape MT (signal writing step). In this signal writing step, the signal output unit 30A is configured to output a pulsed signal (recording current) having a polarity such that a perpendicular component P1 of magnetic field produced thereby at the leading edge EL orients in the upward direction (i.e., the direction opposite to the one of the two opposite thickness directions), as shown in FIG. 4C. In this state, the magnetic field induced at the trailing edge ET has a perpendicular component P2 orients in the downward direction (i.e., the same direction as the one of the two opposite thickness directions).

In this way, the magnetic material is magnetized, by the perpendicular component P1 of the magnetic field produced at the leading edge EL, in the upward direction that is a direction opposite to the direction in which the magnetic material is magnetized in the perpendicular direct-current erasing step, with the result that thus-upwardly-magnetized portion is left as a servo pattern SP to form a servo signal. On the other hand, the magnetic material undergoing the effect of the perpendicular component P2 of magnetic field produced at the trailing edge ET has already been magnetized through the perpendicular direct-current erasing step in the downward direction that is the same direction in which the perpendicular component P2 orients, and thus the state of magnetization is left unchanged. Accordingly, in this embodiment, only the material magnetized at the leading edge EL forms a servo pattern SP so that a servo signal is written in the magnetic tape MT.

Thereafter, the servo signal (servo pattern SP) written in the magnetic tape MT is read out by the verification head 40, and the PES value is determined by the PES computation unit 40A to verify the quality of the servo signal, while the magnetic tape MT is wound up on the take-up reel 22. The magnetic tape MT thus wound up on the take-up reel 22 is stored in a cartridge case known in the art, and the magnetic tape MT with a servo signal written therein (a magnetic tape cartridge) is manufactured.

Figure 8A:
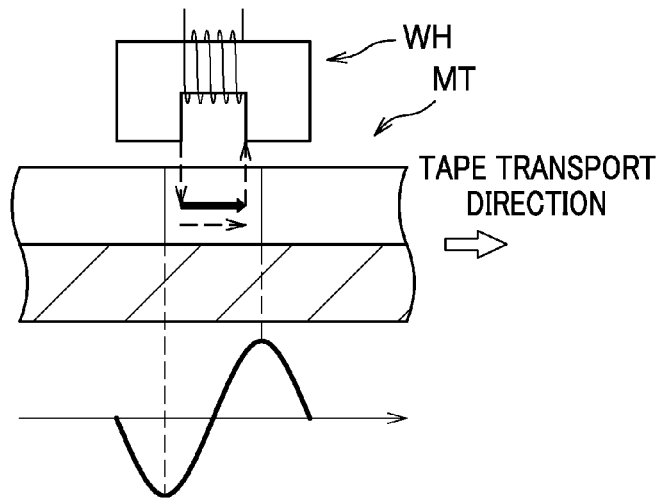
FIG. 8A is a schematic diagram showing an operation of a write head writing a servo signal in a magnetically non-oriented longitudinal magnetic recording tape.
Figure 8B:
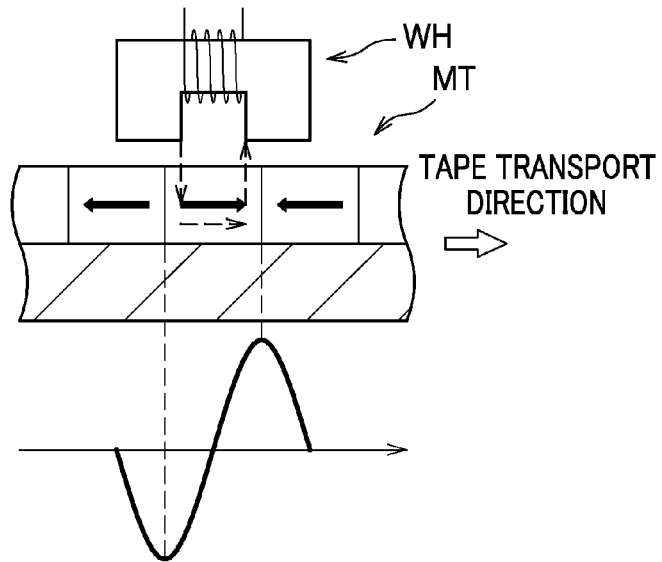
FIG. 8B is a schematic diagram showing an operation of a write head writing a servo signal in a longitudinal magnetic recording tape of which magnetization is erased in advance by magnetizing the tape in one longitudinal direction using a direct current.
Figure 8C:
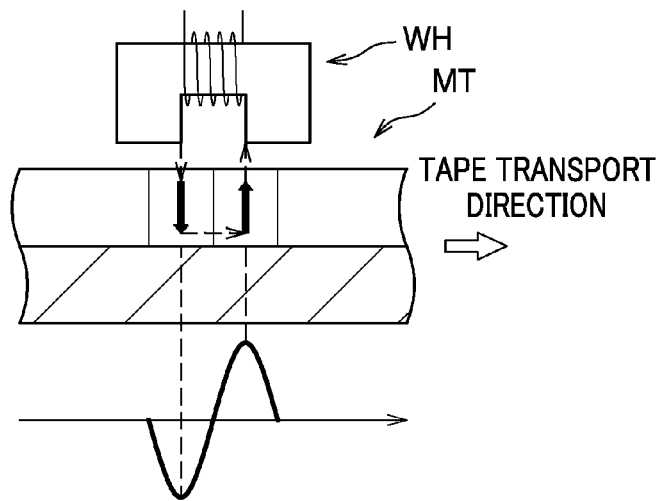
FIG. 8C is a schematic diagram showing an operation of a write head writing a servo signal in a magnetically non-oriented perpendicular magnetic recording-type magnetic tape.

If a servo signal is written by a write head WH having a magnetic gap, as shown in FIG. 8C, in a perpendicular magnetic recording-type magnetic tape MT which is unmagnetized (magnetically non-oriented as a whole) by alternate-current erasing or other method, a pair of magnetic patterns is formed which is composed of a magnetic material magnetized in the downward direction and a magnetic material magnetized in the upward direction. This pair of servo patters is repeatedly recorded at a predetermined interval in the magnetic tape MT, and a servo signal is formed. When such a servo signal in the magnetic tape MT is read out, the readback signal would have a waveform with repeated pairs of peaks whose polarities are opposite to each other. Accordingly, a unipolar-pulse servo signal having peaks of a single polarity cannot be obtained.

On the other hand, in the magnetic tape MT manufactured by the servo writer 1 with the manufacturing method as configured according to the present embodiment, a servo band SB includes a first portion S1 magnetized in the downward direction by the perpendicular direct-current erasing step, and a second portion S2 magnetized in the upward direction by the signal writing step. Therefore, a portion constituting a servo signal (magnetic pattern) is the upwardly magnetized second portion S2 only. When the servo signal in the magnetic tape MT is read out, a unipolar-pulse signal having peaks of a single polarity as shown in FIG. 2B can be obtained.

With this magnetic tape MT with a unipolar-pulse servo signal written therein, the intervals between adjacent servo patterns SP can be reduced, and thus the servo signal writing density in the longitudinal direction of the magnetic tape MT can be increased. As a result, when a track-following servo control is exercised, the time interval between peaks of the readback signal can be reduced, and thus the tracking control over the magnetic head can be performed with increased speed.

Moreover, since the longitudinally oriented component of magnetization in the magnetic layer M of the magnetic tape MT can be consistently oriented in one direction as shown in FIG. 2A and FIG. 4, the intensity of a signal derived from the longitudinally oriented component in the readback servo signal (i.e., noise) can be made smaller.

Furthermore, since the perpendicular direct-current erasing head 60 is disposed in a position downstream relative to the longitudinal direct-current erasing head 50 so that the perpendicular direct-current erasing step is performed after the longitudinal direct-current erasing step, disturbance in the perpendicular component of magnetization oriented in the one of two opposite thickness directions of the magnetic tape MT can be suppressed, so that the noise in the readback servo signal can be reduced.

Second Embodiment

An alternative (second) embodiment of the present invention will now be described in detail. The same elements as in the first embodiment will be designated by the same reference numerals and a duplicate description will be omitted.

In the above-described first embodiment, a magnetic material is magnetized at the leading edge EL as a servo signal in a magnetic tape MT. In the second embodiment, a magnetic material is magnetized at the trailing edge ET as a servo signal in a magnetic tape MT.

Figure 5A:
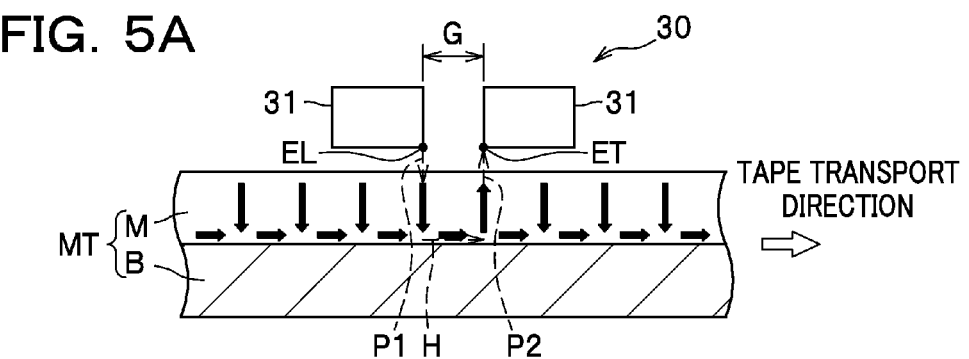
FIG. 5A shows a method for manufacturing a magnetic tape according to a second embodiment.

More specifically, according to the present embodiment, in the signal writing step, the signal output unit 30A of the servo writer 1 is configured, as shown in FIG. 5A, to output a pulsed signal (recording current) having a polarity such that a perpendicular component P2 of magnetic field produced at the trailing edge ET orients in a direction (upward direction) opposite to the direction (downward direction) in which the magnetic material is magnetized in the perpendicular direct-current erasing step. In other words, according to the present embodiment, in the signal writing step, the signal output unit 30A is configured to output a recording current (pulsed signal) of which a current-carrying direction is opposite to that of the recording current outputted in the signal writing step of the first embodiment.

With this configuration, contrary to the situation established in the first embodiment, the magnetic material is magnetized, by the perpendicular component P2 of the magnetic field produced at the trailing edge ET, in the upward direction that is a direction opposite to the direction in which the magnetic material is magnetized in the perpendicular direct-current erasing step, with the result that thus-upwardly-magnetized portion is left as a servo pattern SP to form a servo signal. On the other hand, the magnetic material undergoing the effect of the perpendicular component P1 of magnetic field produced at the leading edge EL has already been magnetized through the perpendicular direct-current erasing step in the downward direction that is the same direction in which the perpendicular component P1 orients, and thus the state of magnetization is left unchanged.

In the present embodiment, in the longitudinal direct-current erasing step, the magnetic tape MT may preferably be magnetized in the rightward direction that is opposite to the direction in which the magnetic tape MT is magnetized in the longitudinal direct-current erasing step in the first embodiment. To be more specific, for example, the N-poles of the longitudinal direct-current erase head 50 shown in FIG. 4A may be opposed to each other with the magnetic tape MT interposed therebetween so that the magnetic tape MT can be magnetized in a direction opposite to the direction of magnetization in the longitudinal direct-current erasing step in the first embodiment. With this configuration, the direction of longitudinal component of magnetization in the longitudinal direct-current erasing step can be made consistent with the direction of longitudinal component of magnetization by the write head 30 in the signal writing step, and thus the intensity of noise in the readback servo signal can be reduced.

Figure 5B:
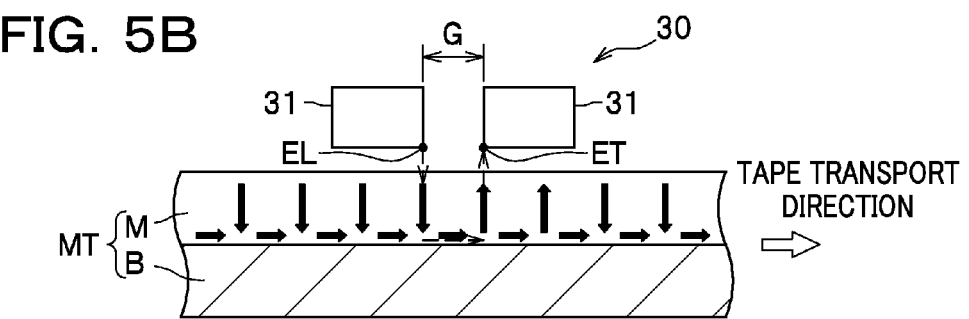
FIGS. 5B and 5C are diagrams showing advantages of the second embodiment.
Figure 5C:
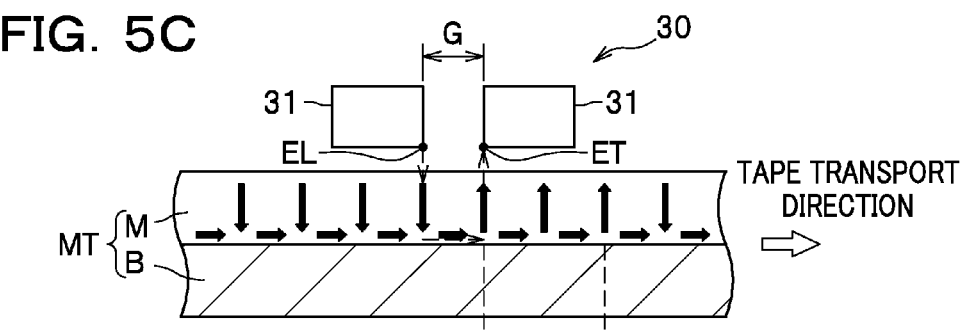
Figure 5D:
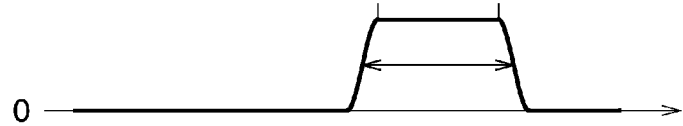
FIG. 5D shows a readback signal obtained from the magnetic tape shown in FIG. 5C.

In the present embodiment, the output time of the pulsed signal outputted by the signal output unit 30A (i.e., a current-carrying time of recording current) may be adjusted, so that a pulse width of the readback signal can be adjusted. To be more specific, in the present embodiment, the magnetic material magnetized at the trailing edge ET is defined to form a servo signal; therefore, as shown in FIGS. 5B and 5C, the length of the servo signal (upwardly magnetized portion) in the longitudinal direction becomes longer according as the output time of the pulsed signal becomes longer. With this configuration, the length in the longitudinal direction of the upwardly magnetized portion (servo pattern SP) can be adjusted by adjusting the output time of the pulsed signal, and thus the pulse width of the readback signal can be adjusted, as shown in FIG. 5D.

In the first embodiment in which the magnetic material magnetized at the leading edge EL remains as a servo signal, even when the output time of a pulsed signal or other factors varies to some degree, the magnetic material (subject to such variation) magnetized upwardly at the leading edge EL is magnetized downwardly at the trailing edge ET and thus canceled, so that a servo pattern SP having a stable length in the longitudinal direction can be written in the magnetic tape MT.

Although the exemplary embodiments of the present invention have been described above, the present invention is not limited to these illustrative, non-limiting embodiments, and may be carried out into practice in various other ways. Thus, it is contemplated that various modifications and changes may be made to the exemplary embodiments of the invention without departing from the scope of the embodiments of the present invention as defined in the appended claims.

In the above-described embodiments, the perpendicular direct-current erase head 60 is disposed in a position downstream relative to the longitudinal direct-current erase head 50, and the perpendicular direct-current erasing step is executed after the longitudinal direct-current erasing step. However, the present invention is not limited to this specific configuration. The order of execution of these steps may be reversed. That is, the perpendicular direct-current erase head may be disposed in a position upstream relative to the longitudinal direct-current erase head, and the longitudinal direct-current erasing step may be executed after the perpendicular direct-current erasing step (and prior to the signal writing step). It is however understood that the perpendicular direct-current erasing step executed after the longitudinal direct-current erasing step can serve to reduce a noise in the readback servo signal, as described above.

In the above-described embodiments, the method for manufacturing a magnetic tape MT including a longitudinal direct-current erasing step (and the servo writer 1 including a longitudinal direct-current erase head 50) is described by way of example, but the present invention is not limited to this specific configuration. That is, the longitudinal direct-current erasing step (and the longitudinal direct-current erase head) may be omitted where appropriate. In other words, the longitudinal component of magnetization in the servo band may not orient in one of the two opposite longitudinal directions (i.e., may be unoriented with respect to the longitudinal direction). It is however understood that if the longitudinal component of magnetization in the magnetic material is consistently oriented in one of the longitudinal directions, the intensity of a noise in the readback servo signal can be reduced.

In the above-described embodiments, the servo writer 1 for use in manufacturing a magnetic tape MT with a servo signal written therein includes a longitudinal direct-current erase head 50 and a perpendicular direct-current erase head 60, but the present invention is not limited to this specific configuration. In other words, the longitudinal direct-current erasing step, the perpendicular direct-current erasing step and the signal writing step may be carried out on dedicated equipment (devices), respectively. It is understood that the perpendicular direct-current erasing step and the longitudinal direct-current erasing step may be executed anytime after magnetic coating applied on the base film is dried before the servo signal is written therein.

EXAMPLES

Advantageous effects derived from the present invention were confirmed by implementing the above-described embodiments of the present invention as follows.
1. Unipolar Pulse Generation Confirmed It was shown that a magnetic tape from which a unipolar-pulse servo signal is retrievable can be manufactured by the method implemented according to the above-described embodiments of the present invention.

Example 1

A magnetic tape with a servo signal written therein (Example 1) was manufactured by the method for manufacturing a magnetic tape with a servo signal written therein implemented according to the aforementioned first embodiment (i.e., a servo signal was written at the leading edge in the perpendicular magnetic recording-type magnetic tape) under the conditions described below. Thereafter, the servo signal was read out from the magnetic tape and a waveform of the readback signal was represented on the oscilloscope as shown in FIG. 6A.
<Conditions>

The transport speed of a magnetic tape (in writing and reading operations) was 4 m/s; the output time of a pulse signal in writing operation were 50 ns, 250 ns; and the magnetic flux density in the perpendicular and longitudinal direct-current steps was 0.7 T.

Example 2

A magnetic tape with a servo signal written therein (Example 2) was manufactured by the method for manufacturing a magnetic tape with a servo signal written therein implemented according to the aforementioned second embodiment (i.e., a servo signal was written at the trailing edge in the perpendicular magnetic recording-type magnetic tape) under the same conditions as in Example 1. In this Example 2, the longitudinal direct-current erasing step was carried out to have the longitudinal component of magnetization in the magnetic tape consistently oriented all together. Thereafter, the servo signal was read out from the magnetic tape and a waveform of the readback signal was represented on the oscilloscope as shown in FIG. 6B.
<Results>

As evident from FIGS. 6A and 6B, it was confirmed that a readback signal having peaks of a single (positive) polarity (i.e., a unipolar-pulse signal) can be obtained from a magnetic tape configured in accordance with the aforementioned embodiments, through the method for manufacturing a magnetic tape implemented in accordance with the aforementioned embodiments, and by a servo writer configured in accordance with the aforementioned embodiments.

From FIG. 6A, it was also confirmed that when the method of Example 1 is applied, the pulse width of the readback signal remains unchanged irrespective of the change in the output time of the pulsed signal in the writing operation. Judging from this result, it was confirmed that a servo signal can be written stably by adopting the method in which a servo signal is written at the leading edge.

Furthermore, from FIG. 6B, it was also confirmed that when the method of Example 2 is applied, the pulse width of the readback signal increases as a result of the extension of the output time of the pulsed signal in the writing operation. Judging from this result, it was confirmed that adjustments of the pulse width of the readback signal made by changing the output time of the pulsed signal in the writing operation can be made available by adopting the method in which a servo signal is written at the trailing edge.
2. Effects of Longitudinal Direct-Current Erasing Step Confirmed It was shown that a longitudinal direct-current erasing step in which the magnetic tape is magnetized in one of two opposite longitudinal directions that is a direction in which a longitudinal component H (see FIG. 5A) of magnetic field leaked at the magnetic gap of the write head orients is advantageous.

Examples 3 and 4

Perpendicular magnetic recording-type magnetic tapes with a servo signal written therein (Examples 3 and 4) were manufactured by executing one of two types of longitudinal direct-current erasing step described below, then executing the perpendicular direct-current erasing step configured in accordance with the aforementioned embodiments described above, and writing a servo signal at the trailing edge. Thereafter the servo signals were read out from the magnetic tapes and waveforms of the readback signals were represented on the oscilloscope as shown in FIG. 7A (Example 3) and in FIG. 7B (Example 4).

<Conditions>

The transport speed of a magnetic tape (in writing and reading operations) was 4 m/s; the output time of a pulse signal in writing operation was 50 ns; and the magnetic flux density in the perpendicular and longitudinal direct-current steps was 0.7 T.

The longitudinal direct-current erasing step executed in Example 3 was of the type such that the magnetic tape is magnetized in one of two opposite longitudinal directions that is a direction in which a longitudinal component of magnetic field leaked at the magnetic gap of the write head orients (i.e., the direction of longitudinal direct-current erasing was the same as the direction of the longitudinal component of magnetic field leaked at the magnetic gap of the write head). On the other hand, the longitudinal direct-current erasing step executed in Example 4 was of the type such that the magnetic tape is magnetized in one of the two opposite longitudinal directions that is opposite to the direction in which a longitudinal component of magnetic field leaked at the magnetic gap of the write head orients (i.e., the direction of longitudinal direct-current erasing was opposite to the direction of the longitudinal component of magnetic field leaked at the magnetic gap of the write head).

<Results>

As shown in FIGS. 7A and 7B, in both of the Examples 3 and 4, a readback signal having peaks of a single (positive) polarity (a unipolar-pulse signal) can be obtained. Moreover, in Example 3 where the direction of longitudinal direct-current erasing was the same as the direction of the longitudinal component of magnetic field leaked at the magnetic gap of the write head, the intensity of a noise component appearing at the negative polarity side was shown to be smaller than that in Example 4. Accordingly, it was confirmed that the intensity of a noise can be made smaller by the direction of longitudinal direct-current erasing being set to the same direction as that of the longitudinal component of magnetic field leaked at the magnetic gap of the write head so that the longitudinally oriented component of the magnetization in the magnetic layer of the magnetic tape is consistently oriented in one direction.

What is claimed is:

1. A method for manufacturing a perpendicular magnetic recording-type magnetic tape with a servo signal written therein by a write head having a magnetic gap, the method comprising:
   a perpendicular direct-current erasing step of magnetizing a magnetic tape in one direction that is one of two opposite thickness directions of the magnetic tape; and
   a signal writing step of writing a servo signal in the magnetic tape by outputting a pulsed signal to the write head after the perpendicular direct-current erasing step.

2. The method according to claim 1, wherein the write head includes a magnetic element having a leading edge and a trailing edge between which the magnetic gap is formed, the leading edge defining an upstream end of the magnetic gap in a direction of transport of the magnetic tape and the trailing edge defining a downstream end of the magnetic gap in the direction of transport of the magnetic tape, and
   wherein the signal writing step comprises using a pulsed signal such that a perpendicular component of magnetic field produced thereby at the leading edge orients in a direction opposite to the one direction, to write the servo signal in the magnetic tape.

3. The method according to claim 1, wherein the write head includes a magnetic element having a leading edge and a trailing edge between which the magnetic gap is formed, the leading edge defining an upstream end of the magnetic gap in a direction of transport of the magnetic tape and the trailing edge defining a downstream end of the magnetic gap in the direction of transport of the magnetic tape, and
   wherein the signal writing step comprises using a pulsed signal such that a perpendicular component of magnetic field produced thereby at the trailing edge orients in a direction opposite to the one direction, to write the servo signal in the magnetic tape.

4. The method according to claim 1, further comprising a longitudinal direct-current erasing step of magnetizing the magnetic tape in one of two opposite longitudinal directions of the magnetic tape that is a direction in which a longitudinal component of magnetic field leaked at the magnetic gap orients, wherein the longitudinal direct-current erasing step is performed prior to the signal writing step.

5. The method according to claim 4, wherein the perpendicular direct-current erasing step is performed after the longitudinal direct-current erasing step.

6. A perpendicular magnetic recording-type magnetic tape comprising a servo band with a servo signal written therein, wherein the servo band includes:
   a first portion magnetized with a perpendicular component of magnetization orienting in one direction that is one of two opposite thickness directions of the magnetic tape, the first portion constituting a background for the servo signal; and
   a second portion magnetized with a perpendicular component of magnetization orienting in a direction opposite to the one direction, the second portion constituting the servo signal.

7. The perpendicular magnetic recording-type magnetic tape according to claim 6, wherein the first and second portions of the servo band have magnetism of which longitudinal components of magnetization orients in one direction that is one of two opposite longitudinal directions of the magnetic tape.

8. A servo writer for writing a servo signal in a magnetic tape for use in perpendicular magnetic recording, comprising:
   a write head configured to write the servo signal in the magnetic tape, the write head having a magnetic gap;
   a signal output unit configured to output a pulsed signal to the write head; and
   a perpendicular direct-current erasing head provided in a position upstream relative to the write head along a path traveled by the magnetic tape, the perpendicular direct-current erasing head being configured to magnetize the magnetic tape in one direction that is one of two opposite thickness directions of the magnetic tape.

9. The servo writer according to claim 8, wherein the write head includes a magnetic element having a leading edge and a trailing edge between which the magnetic gap is formed, the leading edge defining an upstream end of the magnetic gap in a direction of transport of the magnetic tape and the trailing edge defining a downstream end of the magnetic gap in the direction of transport of the magnetic tape, and
   wherein the pulsed signal outputted by the signal output unit is configured such that a perpendicular component of magnetic field produced by the pulsed signal at the leading edge orients in a direction opposite to the one direction.

10. The servo writer according to claim 8, wherein the write head includes a magnetic element having a leading edge and a trailing edge between which the magnetic gap is formed, the leading edge defining an upstream end of the magnetic gap in a direction of transport of the magnetic tape and the trailing edge defining a downstream end of the magnetic gap in the direction of transport of the magnetic tape, and wherein the pulsed signal outputted by the signal output unit is configured such that a perpendicular component of magnetic field produced by the pulsed signal at the trailing edge orients in a direction opposite to the one direction.

11. The servo writer according to claim 8, further comprising a longitudinal direct-current erasing head provided in a position upstream relative to the write head along the path traveled by the magnetic tape, the longitudinal direct-current erasing head being configured to magnetize the magnetic tape in one of two opposite longitudinal directions of the magnetic tape that is a direction in which a longitudinal component of magnetic field leaked at the magnetic gap orients.

12. The servo writer according to claim 11, wherein the perpendicular direct-current erasing head is disposed in a position downstream relative to the longitudinal direct-current erasing head along the path traveled by the magnetic tape.

\* \* \* \* \*